(12) United States Patent
Berberich

(10) Patent No.: US 6,177,864 B1
(45) Date of Patent: Jan. 23, 2001

(54) DEVICE FOR ACTUATING ELECTRONIC EQUIPMENT IN A MOTOR VEHICLE

(75) Inventor: Reinhold Berberich, Frankfurt (DE)

(73) Assignee: Mannesmann VDO AG, Frankfurt (DE)

(*) Notice: Under 35 U.S.C. 154(b), the term of this patent shall be extended for 0 days.

(21) Appl. No.: 09/195,839

(22) Filed: Nov. 19, 1998

(30) Foreign Application Priority Data

Dec. 4, 1997 (DE) .................................... 197 53 802

(51) Int. Cl.$^7$ .................................................. B60R 25/10
(52) U.S. Cl. ...................... 340/426; 340/425.5; 340/429; 340/937; 340/438
(58) Field of Search .................... 340/425.5, 426–429, 340/937, 438

(56) References Cited

U.S. PATENT DOCUMENTS

| | | | |
|---|---|---|---|
| 4,679,077 | * | 7/1987 | Yuasa et al. .......................... 358/108 |
| 5,739,757 | * | 4/1998 | Gioutsos .............................. 340/667 |
| 5,845,000 | * | 12/1998 | Breed et al. ......................... 382/100 |

FOREIGN PATENT DOCUMENTS

| | | |
|---|---|---|
| 4023109 | 1/1992 | (DE) . |
| 4204996 | 8/1993 | (DE) . |
| 4339113 | 9/1996 | (DE) . |
| 2289332 | 11/1995 | (GB) . |

* cited by examiner

Primary Examiner—Daryl Pope
(74) Attorney, Agent, or Firm—Martin A. Farber

(57) ABSTRACT

A device for actuating electronic equipment in a motor vehicle has a picture-taking sensor unit (21) for monitoring the passenger compartment (1) of the motor vehicle and a evaluation unit (22) for recognizing pictures of the picture-taking sensor unit (21). If the piece of electronic equipment is an airbag (12–15) arranged in front of a vehicle seat (2–4), the triggering of the airbag (12–15) in the event of a crash can be prevented if there is no person (5–7) or no object (8) located on the vehicle seat (2–4).

19 Claims, 2 Drawing Sheets

DEVICE FOR ACTUATING ELECTRONIC EQUIPMENT IN A MOTOR VEHICLE

FIELD AND BACKGROUND OF THE INVENTION

The invention relates to a device for actuating electronic equipment in a motor vehicle, having a sensor element for generating electronic signals as a function of positions of persons and/or objects in a passenger compartment of the motor vehicle, and having an evaluation unit for evaluating the electronic signals.

Such a device is known from DE-A-42 04 996 for actuating a piece of electronic equipment which is, for example, in the form of a cassette recorder. The sensor element has two infrared sensors for registering the position of a movable control device for the piece of electronic equipment. The intention is that the signals of the device will be used to disable functions of the control device if the control device is located in the region of the driver of the motor vehicle.

Such devices are in practice frequently also connected to an antitheft alarm system in order, for example, to activate a horn if someone reaches into the motor through an open window. However, with most sensor elements which are designed as infrared sensors there is the risk, in particular at high external temperatures, of false alarms of the antitheft alarm system.

Furthermore, from practice, such devices are known for actuating an airbag. Here, pressure-sensitive sensor elements are mounted in vehicle seats so that the triggering of the airbag may be avoided if the corresponding vehicle seat is unoccupied. However, these pressure-sensitive sensor elements are not capable of distinguishing whether there is a person or, for example, a child's seat or some other object on the vehicle seat.

SUMMARY OF THE INVENTION

The invention is based on the problem of designing a device of the type mentioned at the beginning in such a way that the persons and/or objects in the passenger compartment are reliably registered and the actuation of different electronic equipment is made possible with as little complexity as possible.

This problem is solved in accordance with the invention by virtue of the fact that the sensor element is designed as a picture-taking sensor unit, and the evaluation unit is designed to recognize pictures of the picture-taking sensor unit.

By virtue of this design, the passenger compartment of the motor vehicle is visually registered by the picture-taking sensor unit, and the persons and/or the objects in the passenger compartment are detected by the evaluation unit. In this way, the device according to the invention can recognize simply and precisely whether, for example, the control device is located in the vicinity of the driver and whether a vehicle seat is occupied by a person or an object. Thanks to the invention, it is possible, for example, to avoid the triggering of the airbag actuated with the device according to the invention if the corresponding vehicle seat is occupied only by an object or if there is an object located on the lap of a person. The evaluation unit can be used to actuate various pieces of equipment such as an airbag, antitheft alarm system or control devices in the motor vehicle, for example. Furthermore, high temperatures no longer give rise to incorrect signals of the device according to the invention. By means of the evaluation unit it is also possible to determine whether the motor vehicle contains an animal or a human so that the risk of a false alarm of the antitheft alarm system actuated with the device according to the invention can be reduced further. Since only a single sensor element and a single evaluation unit is required for various pieces of electronic equipment, the device according to the invention requires a particularly low degree of structural complexity.

Thus, by means of a picture-processing unit it is possible to distinguish both persons and objects as such and, furthermore, also to determine the precise position of the persons and/or objects.

Triggering of the airbag should, as a rule, be avoided if the person is not seated appropriately on the corresponding vehicle seat. This is the case, for example, if the person has placed his legs on the dashboard of the motor vehicle. In such a case, the triggering of the airbag actuated with the device according to the invention can be prevented simply if the actuation unit is designed to recognize the sitting position of a person on a vehicle seat. A multistage airbag can be actuated simply with the device according to the invention if the evaluation device is designed to sense sizes and/or weights of persons. Such multistage airbags—referred to frequently as intelligent airbags—inflate to different degrees as a function of the size and the weight of the person on the vehicle seat.

The device according to the invention is of particularly simple design if the evaluation unit has an electronic memory for various sitting positions and for various sizes and weights of the persons, and is designed to compare the stored values with the picture of the picture-taking sensor unit.

The device according to the invention can be mounted particularly simply on the motor vehicle and connected to the electronic equipment by means of short electric leads if the picture-taking sensor unit is provided for arrangement in the region of a dashboard of the motor vehicle.

The single picture-taking sensor unit can be used to register virtually completely the passenger compartment of the motor vehicle if the picture-taking sensor unit is provided for arrangement in a region adjoining an interior mirror.

According to another advantageous development of the invention, the picture-taking sensor unit does not cause the field of vision of the driver to be narrowed if the picture-taking sensor unit is provided for arrangement behind a translucently designed interior mirror of the motor vehicle.

The airbag frequently has an arithmetic unit which processes and evaluates signals of a crash sensor. One possibility would be to feed the signals of the evaluation unit of the device according to the invention to this arithmetic unit. However, it helps to reduce the electronic components in the motor vehicle, if, in accordance with another advantageous development of the invention, the evaluation unit has an arithmetic unit which is designed to link logically the signals of the picture-taking sensor unit and of a crash sensor.

It is advantageous to reduce further the electronic components in the motor vehicle if, in accordance with another advantageous development of the invention, the evaluation unit has an arithmetic unit which is designed to link logically the signals of the picture-taking sensor unit and of a glass breakage sensor and/or of a door sensor. By virtue of this design, it is possible for the antitheft alarm system to be actuated directly by the device according to the invention.

The picture-taking sensor unit could permanently monitor the passenger compartment of the motor vehicle. However, it helps to reduce the consumption of electrical current of the device according to the invention if the picture-taking sensor unit is designed to generate, in each case, an individual picture after a time interval which is provided. The time interval could be, for example, one to two seconds.

It helps to reduce further the consumption of electrical current by the device according to the invention if the evaluation unit can be activated as a result of a change in the signals of the picture-taking sensor unit.

BRIEF DESCRIPTION OF THE DRAWINGS

The invention permits numerous embodiments. For the sake of further clarification of its basic principles, two of these embodiments are illustrated in the drawing and are described below. In said drawing.

DETAILED DESCRIPTION OF THE PREFERRED EMBODIMENTS

Figure 1:
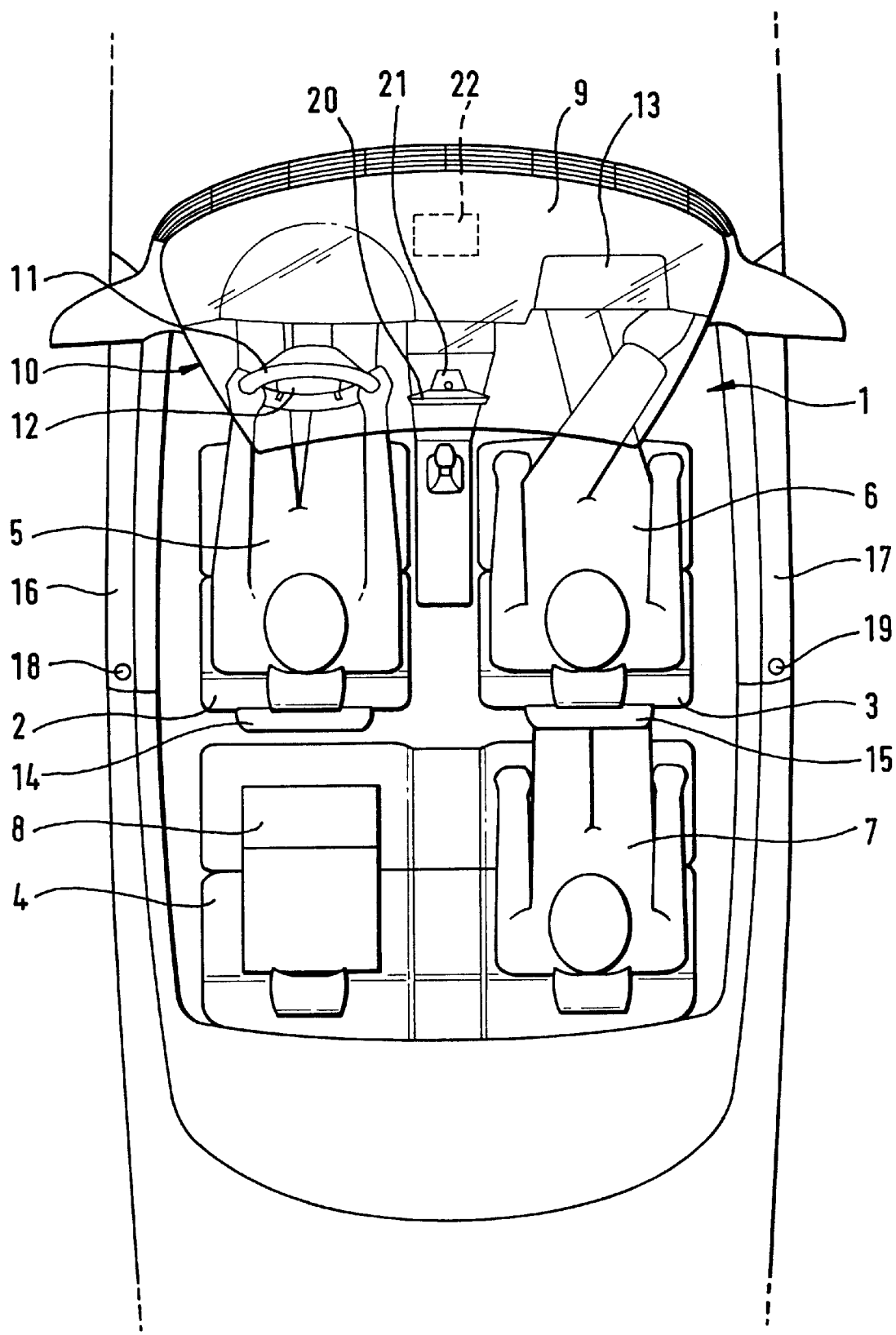
FIG. 1 shows a view from above of a passenger compartment of a motor vehicle with a device according to the invention.

FIG. 1 shows a passenger compartment 1 of a motor vehicle from above with two vehicle seats 2, 3 arranged in the front region and one rear bench seat 4. The vehicle seats 2, 3 and the rear bench seat 4 are occupied by a plurality of persons 5–7 and an object 8. Toward the front, the passenger compartment 1 is bounded by a windshield 10 arranged above a dashboard 9. Airbags 12–15 are arranged respectively in the dashboard 9, a steering wheel 11, arranged in front of the dashboard 9, of the motor vehicle, and at the rear of the vehicle seats 2, 3. The motor vehicle has vehicle doors 16, 17 which are provided with door sensors 18, 19 and generate electronic signals when vehicle doors 16, 17 are opened. A translucent interior mirror 20 is mounted on the windshield 10 of the motor vehicle. A videocamera 21 for registering the persons 5–7 and the object 8 is arranged behind the interior mirror 20. An evaluation unit 22, which is connected to the videocamera 21, the door sensors 18, 19 and the airbags 12–15, is located under the dashboard 9 at a point which cannot be seen here.

The evaluation unit 22 and the picture-taking sensor unit 21 form a device according to the invention with which it is sensed whether persons 5–7 or objects 8 are located in front of the airbags 12–15. As a result, the airbag 15, in front of which none of the persons is located, is prevented from being triggered. When the ignition is switched off, the videocamera 21 monitors the passenger compartment 1 and controls an antitheft alarm system (not illustrated).

Figure 2:
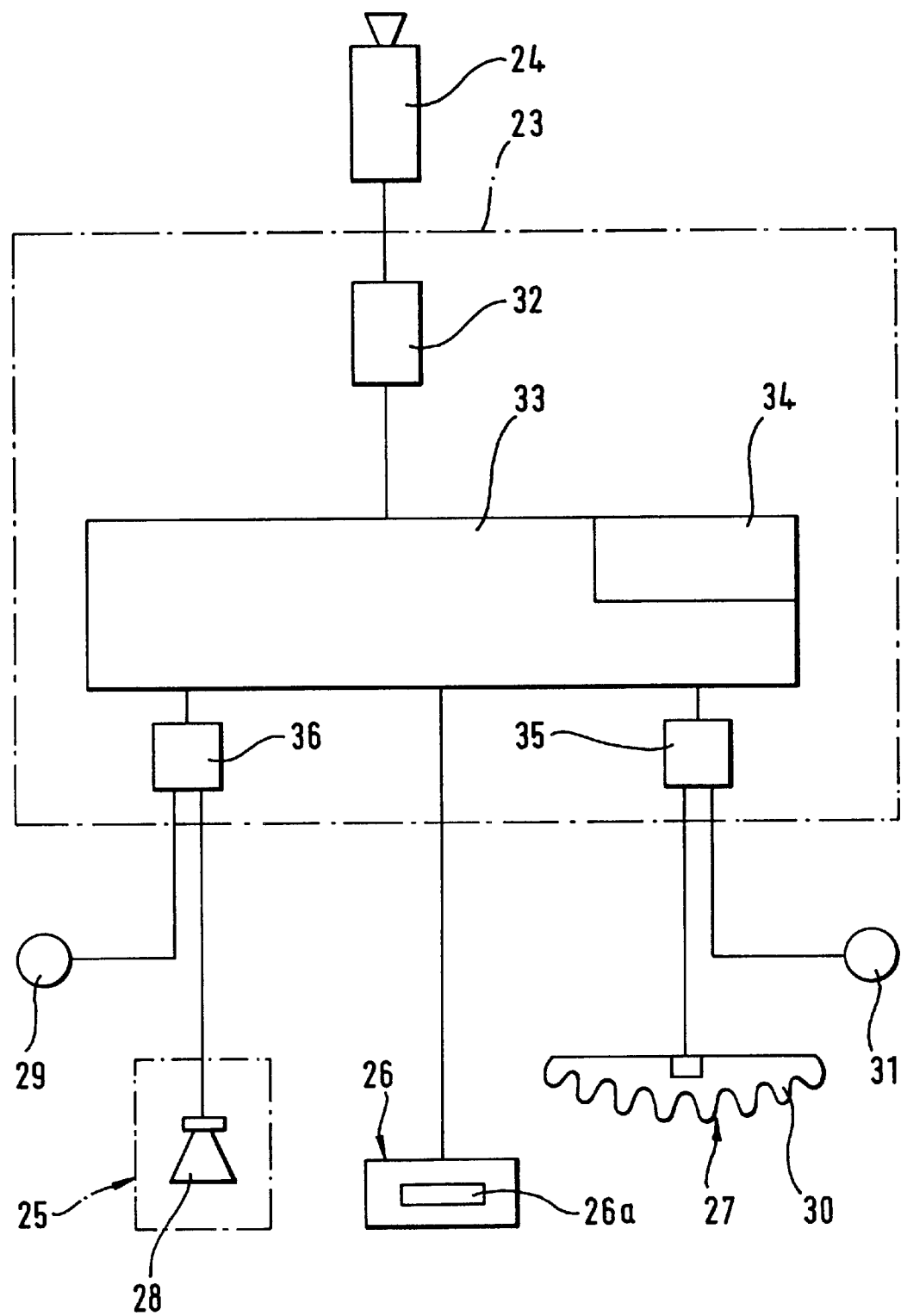
FIG. 2 shows a signal diagram of a further embodiment of the device according to the invention.

FIG. 2 shows a schematic view of a further embodiment of the device according to the invention having an evaluation unit 23 (illustrated by dot-dashed lines) and a videocamera 24. Three pieces of electronic equipment 25–27, by way of example, are connected to the evaluation unit 23. One of the pieces of electronic equipment 25 is designed as an antitheft alarm system with a horn 28 and a glass breakage sensor 29. The second piece of equipment 26 has a cassette recorder 26a and the third piece of equipment 27 has an airbag with a crash sensor 31. The picture-taking sensor unit 24 is connected to a signal conditioning system 32 which feeds the electronic signals to a picture processing system 33. An electronic memory 34 with data for sitting positions of persons 5–7 (illustrated in FIG. 1) and for objects is arranged in the picture processing system 33. By comparing the signals supplied by the signal conditioning system 32 with the data located in the memory 34, the picture processing system 33 recognizes which of the vehicle seats of the motor vehicle persons are located on and converts the results into electronic signals. These signals are fed to an arithmetic unit 35 which actuates the airbag 30, or prevents actuation, as a function of said signals and of signals of the crash sensor 31.

In addition, the videocamera 24 determines which person is operating the cassette recorder 26a. If the driver of the motor vehicle is operating said cassette recorder, the functions of the cassette recorder 26a are partially or entirely disabled. With the aid of this device, a sound system which is located in the motor vehicle can be adapted automatically to the occupation of the seats by setting the balance appropriately, for example. This avoids the driver being able to be distracted from the events on the road by performing complicated settings of the cassette recorder 26a.

When the ignition of the motor vehicle is switched off, the passenger compartment is monitored by the videocamera 24 and the signals of the picture processing system 33 and those of the glass breakage sensor 29 are fed to an arithmetic unit 36 which is connected to the horn 28. As a result, the horn 28 can be actuated either if the glass breakage sensor 29 recognizes a broken window (not illustrated) of the motor vehicle or detects if someone reaches into the motor vehicle through an open window.

What is claimed is:

1. A device for actuating electronic equipment in a motor vehicle, comprising:

a sensor element for generating electronic signals as a function of positions of persons and/or objects in a passenger compartment of the motor vehicle; and an evaluation unit for evaluating the electronic signals, the evaluating being responsive to the status of the ignition of the motor vehicle to perform plural functions of airbag control and antitheft control with said sensor element;

wherein the sensor element comprises a picture-taking sensor unit, and the evaluation unit is operative to recognize pictures of the picture-taking sensor unit;

wherein the evaluation unit is operative to sense sizes and/or weights of the persons.

2. The device as claimed in claim 1, wherein the evaluation unit is operative to recognize the sitting position of a person on a seat of the vehicle.

3. The device as claimed in claim 1, wherein the evaluation unit is operative to sense sizes and/or weights of the persons.

4. The device as claimed in claim 1, wherein the evaluation unit comprises an electronic memory for storing data of various sitting positions and various sizes and weights of persons, and means for comparing stored data with the pictures of the picture-taking sensor unit.

5. The device as claimed in claim 1, wherein the picture-taking sensor unit is configured for emplacement in a region of a dashboard of the motor vehicle.

6. The device as claimed in claim 1, wherein the picture-taking sensor unit is configured for emplacement in a region adjoining an interior mirror.

7. The device as claimed in claim 1, wherein the picture-taking sensor unit is configured for emplacement behind a translucent interior mirror of the motor vehicle.

8. The device as claimed in claim 1, wherein the evaluation unit comprises an arithmetic unit operative to link logically the signals of the picture-taking sensor unit and signals of a crash sensor.

9. The device as claimed in claim 1,
wherein said plural functions include also a control of a cassette recorder, and the evaluation unit comprises an arithmetic unit operative to link logically the signals of the picture-taking sensor unit and signals of a glass breakage sensor and/or of a door sensor.

10. The device as claimed in claim 1, wherein the picture-taking sensor unit is operative to generate a succession of pictures separated by time intervals.

11. The device as claimed in claim 1, wherein the evaluation unit is actuatable as a result of the signals of the picture-taking sensor unit.

12. The device as claimed in claim 9, wherein the evaluation unit is operative to recognize the sitting position of a person on a seat of the vehicle.

13. The device as claimed in claim 9, wherein the evaluation unit comprises an electronic memory for storing data of various sitting positions and various sizes and weights of persons, and means for comparing stored data with the pictures of the picture-taking sensor unit.

14. The device as claimed in claim 9, wherein the picture-taking sensor unit is configured for emplacement in a region of a dashboard of the motor vehicle.

15. The device as claimed in claim 9, wherein the picture-taking sensor unit is configured for emplacement in a region adjoining an interior mirror.

16. The device as claimed in claim 9, wherein the picture-taking sensor unit is configured for emplacement behind a translucent interior mirror of the motor vehicle.

17. The device as claimed in claim 9, wherein the arithmetic unit is operative to link logically the signals of the picture-taking sensor unit and signals of a crash sensor.

18. The device as claimed in claim 9, wherein the picture-taking sensor unit is operative to generate a succession of pictures separated by time intervals.

19. The device as claimed in claim 1, wherein the evaluation unit is actuatable as a result of the signals of the picture-taking sensor unit.

* * * * *